(12) United States Patent
Rozenberg et al.

(10) Patent No.: US 10,769,293 B2
(45) Date of Patent: *Sep. 8, 2020

(54) PRIVACY PRESERVING DATA SEARCH

(71) Applicant: Protegrity Corporation, Grand Cayman (KY)

(72) Inventors: Yigal Rozenberg, Wilton, CT (US); Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 82 days.

This patent is subject to a terminal disclaimer.

(21) Appl. No.: 16/268,500

(22) Filed: Feb. 6, 2019

(65) Prior Publication Data

US 2019/0171839 A1    Jun. 6, 2019

Related U.S. Application Data

(63) Continuation of application No. 15/697,031, filed on Sep. 6, 2017, now Pat. No. 10,242,216, which is a continuation of application No. 14/034,470, filed on Sep. 23, 2013, now Pat. No. 9,785,786.

(60) Provisional application No. 61/704,667, filed on Sep. 24, 2012.

(51) Int. Cl.
*G06F 21/62* (2013.01)

(52) U.S. Cl.
CPC ...... *G06F 21/6218* (2013.01); *G06F 21/6227* (2013.01); *G06F 2221/2113* (2013.01)

(58) Field of Classification Search
CPC ............. G06F 21/6218; G06F 21/6227; G06F 2221/2113; G06F 21/62
See application file for complete search history.

(56) References Cited

U.S. PATENT DOCUMENTS

| | | | |
|---|---|---|---|
| 7,120,933 B2 | 10/2006 | Mattsson | |
| 7,305,707 B2 | 12/2007 | Mattsson | |
| 7,721,225 B2 | 5/2010 | Montroy et al. | |
| 8,082,242 B1 * | 12/2011 | Mysen | G06F 16/335 707/711 |
| 2008/0162402 A1 * | 7/2008 | Holmes | G06F 21/6227 |
| 2009/0144260 A1 | 6/2009 | Bennett et al. | |

(Continued)

OTHER PUBLICATIONS

Mattsson, U.T., "Format-Controlling Encryption Using Datatype-Preserving Encryption," 46 pages, [Online] [Retrieved on Jan. 9, 2014] Retrieved from the Internet <URL:http://csrc.nist.gov/groups/ST/toolkit/BCM/documents/proposedmodes/fcem/fcem-spec.pdf>.

(Continued)

*Primary Examiner* — Ashokkumar B Patel
*Assistant Examiner* — Quazi Farooqui
(74) *Attorney, Agent, or Firm* — Fenwick & West LLP

(57) ABSTRACT

Database entries can be protected by indexing the entries using a plurality of indexes, each associated with a level of access rights. A level of access rights can be determined from a search query, and an index can be selected based on the determined level of access rights. A search key can be generated based on the received query, and the selected index can be searched using the search query. Database entries mapped to the values of the selected index returned in response to the search can be outputted. Each index is associated with a different granularity defining the number and/or ambiguity of search results returned in response to searching an index.

18 Claims, 4 Drawing Sheets

(56) References Cited

U.S. PATENT DOCUMENTS

| | | |
|---|---|---|
| 2009/0249082 A1 | 10/2009 | Mattsson |
| 2010/0174709 A1* | 7/2010 | Hansen ............... G06F 16/9537 |
| | | 707/728 |
| 2011/0213807 A1 | 9/2011 | Mattsson |
| 2011/0225165 A1* | 9/2011 | Burstein ............. G06F 16/2272 |
| | | 707/741 |
| 2013/0031372 A1 | 1/2013 | Oltmans et al. |

OTHER PUBLICATIONS

McCallister, E. et al., "Guide to Protecting the Confidentiality of Personally Identifiable Information (PII)," PH: NIST SP 800-122, Apr. 2010, 59 pages, [Online] [Retrieved on Jan. 9, 2014] Retrieved from the Internet <URL:http://csrc.nist.gov/publications/PubsSPs.html>.

United States Office Action, U.S. Appl. No. 14/034,470, dated Jun. 21, 2017, 22 pages.

United States Office Action, U.S. Appl. No. 14/034,470, dated Apr. 26, 2017, 26 pages.

United States Office Action, U.S. Appl. No. 14/034,470, dated Mar. 2, 2017, 23 pages.

United States Office Action, U.S. Appl. No. 14/034,470, dated Nov. 15, 2016, 22 pages.

United States Office Action, U.S. Appl. No. 14/034,470, dated Aug. 31, 2016, 21 pages.

United States Office Action, U.S. Appl. No. 14/034,470, dated May 16, 2016, 19 pages.

* cited by examiner

PRIVACY PRESERVING DATA SEARCH

CROSS REFERENCE TO RELATED APPLICATIONS

This application is a continuation of U.S. application Ser. No. 15/697,031, filed Sep. 6, 2017, now U.S. Pat. No. 10,242,216, which application is a continuation of U.S. application Ser. No. 14/034,470, filed Sep. 23, 2013, now U.S. Pat. No. 9,785,786, which application claims the benefit of Provisional Application No. 61/704,667 filed on Sep. 24, 2012, all of which are incorporated herein by reference in their entirety.

FIELD OF ART

This disclosure relates to database security, and in particular, to providing increased database search security through data indexing.

BACKGROUND

Many devices, websites, services, and applications implement various data protection techniques. Certain techniques involve the use of an encryption key or password that can be subject to interception or brute force guessing. Other methods may protect data but require extensive computing resources to encode and decode data. Such methods often fail to utilize various data format or indexing advantages when protecting the data. Often, systems implementing data protection techniques are required to protect date information, but also allow for different level of access to search the protected data based on a user's access rights. Thus, it may be advantageous to implement data protection techniques that allow the data to be searched with different access levels.

SUMMARY

A database management system is configured to protect data stored in a database by using access rights based indexing and searching in combination with encryption and tokenization of the data. The database management system maintains a plurality of indices for data in a database table, each index have a specific level of granularity relative to the data that each index value maps to. Each index stores one or more references to the location of data associated with each reference. For example, data that is organized into cells in a table having numbered rows and columns can be indexed by a row index that includes row numbers as values and a column index that includes column numbers as values.

The granularity of a database index is based upon a measure of the number of data entries associated with each index value, for example the average number of data entries for each index value. Indices with high granularity have on average a low number of data entries per index value, while indices with low granularity have a high number of data entries per index value. The granularity for an index is indirectly controlled by the range of index values, where a wider range allows for a higher granularity. For example, a "month" index that associates all date entries within a given month with a single index value necessarily has a higher granularity than a "day" index which associates all date entries with a given day with the corresponding "day" index value.

The database management system determines which indices to use for searching the database based on the level access rights of a user requesting the search. For a user having a high level of access rights, the search system performs a user search of the data using an index of high granularity, resulting in fewer and more relevant search results being returned to the user. Likewise, for a user having a low level of access rights the search system performs a user search of the data using an index of low granularity, resulting in a greater number of search results being returned. Returning a greater number of search results increases the ambiguity of individual data, resulting in an increase in privacy of sensitive information associated with the results.

In one embodiment, searching a database indexed with a plurality of indexes is implemented by a computer system. The computer system utilizes multiple indexes, each indexing a portion of the database. Each index is associated with a different level of access rights of a user to the database. The computer system receives a query to search the indexed portion of the database from a user. The computer system then determines the level of access rights associated with the user. The computer system selects a particular index based on the determined level of access rights. Based on the selected index the system maps the query to a search key based. The mapping translates the query into values and a format that the computer system can compare with the values of the selected index when searching the index. Upon determining a match between the search key and values of the selected index, the computer system outputs data that is associated with the matched values.

The features and advantages described in this summary and the following detailed description are not all-inclusive. Many additional features and advantages will be apparent to one of ordinary skill in the art in view of the drawings, specification, and claims hereof.

Figure 1:
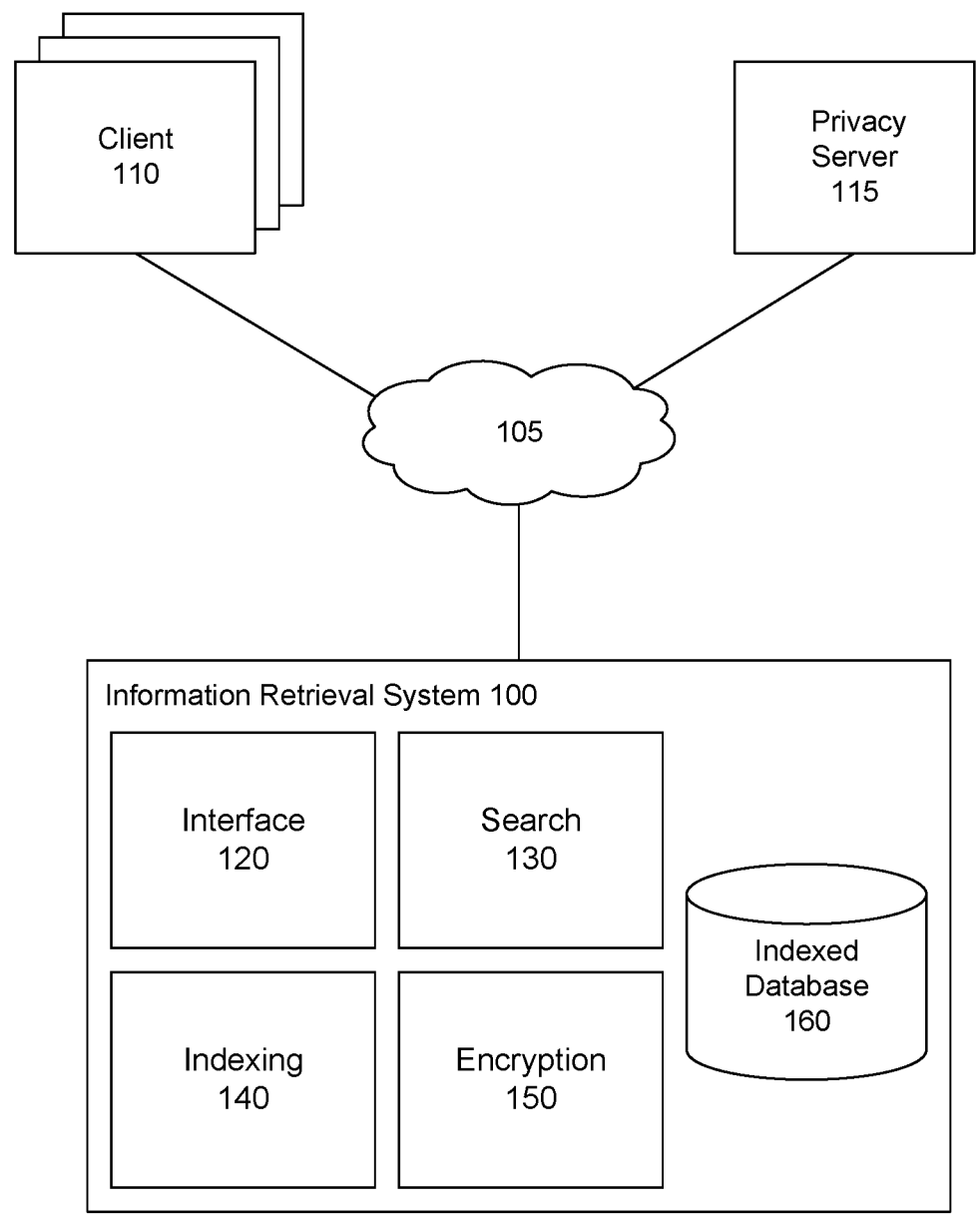
FIG. 1 is a system environment diagram for an information retrieval system, according to one embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Information Retrieval Overview

Data in a database can be protected through various means of information retrieval, for instance using access rights based indexing and searching in addition to hashing any search indexes. The database management system indexes data entries within a database using a set of index values and mapping each database entry to one or more of the index values. A search of indexed data identifies one or more index values associated with the search, and will return all database entries that are mapped to the identified one or more index values. In one embodiment, the shorter the length of index values, the greater the number of database entries that are mapped to each index value, and the greater the number of results returned in response to performing a search of the indexed data (and, thereby, the lower the granularity of the index).

The granularity of an index refers to the average number of database entries mapped to each index value. An index with fewer index values will have a relatively large number of database entries are mapped to each index value, and is said to have low or coarse granularity. Conversely, an index with more index values will tend to have a relatively smaller number of database entries mapped to each index value, and is said to have high or fine granularity. Performing a search on an index with a low granularity results in (on average) a greater number of, and often less relevant, search results. Likewise, performing a search on an index with a high granularity results in (on average) a smaller number of, and often more relevant, search results.

All or part of the data stored in a database may be indexed. In addition, multiple indexes may be used to index portions of the data within the database, and portions of the database may be indexed with multiple indexes. In one embodiment, each column in a database is indexed using multiple different indexes having different granularities. Any type of data index may be used herein, such as a non-clustered index, a clustered index, a bitmap index, a dense index, a sparse index, a reverse index, and the like. The mapping of database entries to index values may be based on all or part of the database entries. It should be noted that although the embodiments described herein refer to data organized in rows and columns within a database, the operations described herein at equally applicable to any form or format of data.

As used herein, a value of an index refers to a string of characters, including but not limited to numeric, symbolic, or alphanumeric characters, and the like. An index value can have the same number of characters as the string of the data that it references, or can have a different number of characters. Further, the index value can have characters of the same type (such as numeric, symbolic, or alphanumeric characters) as the string of characters that the value references or characters of a different type.

A search key is used to query an index. A search key can be subject to format and content restrictions. For instance, if an index includes only numeric values, each mapped to one or more database entries, a user query must be mapped to a search key including only numeric values prior to searching the index. A search key therefore depends on the search query and the searched index, and the search query uniquely maps to a particular search key.

An index can have a variable granularity, where the number of data entries that are mapped to each index value varies. For instance, if a listing of names contains a disproportionately large number of names that begin with "J" and very few names that begin with "K," a search query beginning with "K" will return fewer results than a search query beginning with "J."

Figure 2:
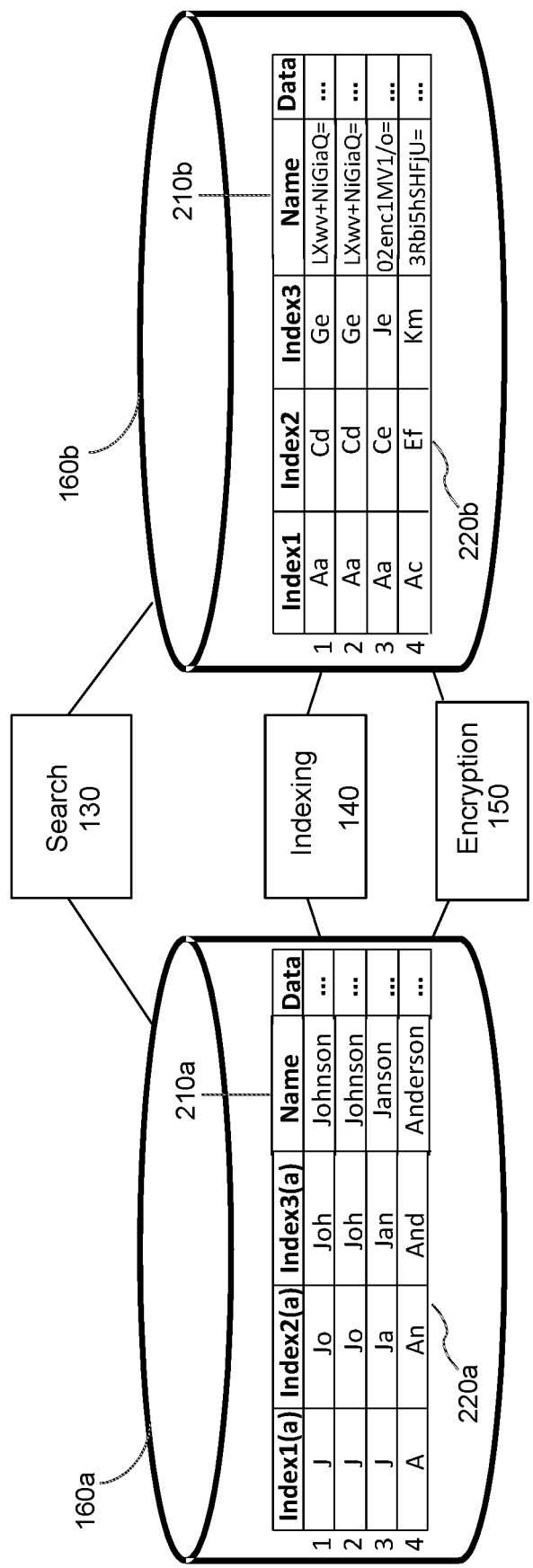
FIG. 2 illustrates non-hashed and hashed examples of an indexed database within the information retrieval system of FIG. 1, according to one embodiment.
Figure 3:
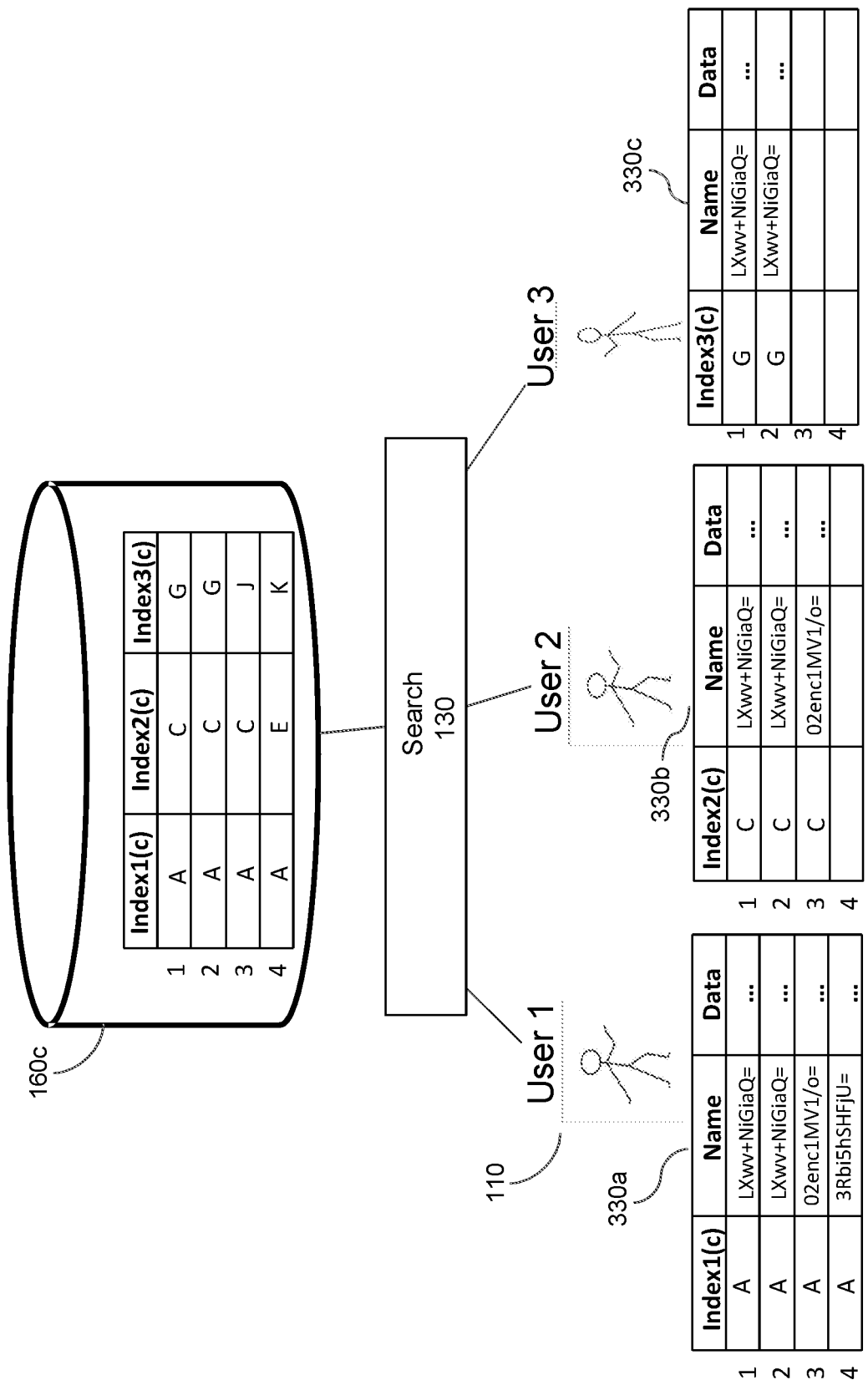
FIG. 3 illustrates data search and retrieval within the information retrieval system of FIG. 1 by users having different levels of access rights, according to one embodiment.

Such a variable granularity can be overcome by increasing the possible range of index values that an index encompasses. For instance, an index may be designed that maps names beginning with "J" to an index value based on the first two letters of the name (e.g., "Ja" and "Jb" would map to different index values), but maps names beginning with "K" to an index value based only on the first letter of the name (e.g., all names beginning with "K" map to the same index value). Though the database illustrated in FIGS. 2 and 3 is small for the purposes of simplicity, a typical large database may have a million or more entries per index value with hundreds or more indexes. In such a database, an index may have thousands or more unique index values, each mapped to (on average) a thousand or more database entries.

The index used for searching data within an indexed database is based on the level of access rights associated with a user. By limiting the use of high granularity indexes to users with high levels of access rights, the indexed data is protected from users with low levels of access rights, thereby preserving the privacy associated with the data. For instance, searching data using a low granularity index results in less-specific or relevant and more data entries being returned than searching the same data using a high granularity index, increasing the ambiguity of the returned data entries, and increasing the privacy of each individual data entry.

For example, if a user queries a database including names for a person named "Johnson", and the search system uses a low granularity index to search the data, all names beginning with "J" may be returned. If the data is encrypted, tokenized, or otherwise protected, returning the protected names beginning with "J" will not enable a user to identify the number of "Johnson" names listed in the database, but instead will only enable a user to identify the number of "J" names, increasing the privacy of the individuals listed in the database. Any type of tokenization (described below) or encryption (as known in the art) may be used to protect data within a data in conjunction with the invention described herein.

A user's level of access rights can be based on any suitable criteria, such as employment, status, position, rank, or any other criteria or property of the user. In one embodiment where data is indexed using an index of low granularity, an index of medium granularity, and an index of high granularity, an information retrieval system is adopted to use the index of low granularity for a user with basic or limited access rights (e.g., a non-employee), the index of medium granularity for a user with greater access rights (e.g., a non-manager employee), and the index of high granularity for a user with the highest level of access rights (e.g., a manager, executive, database administrator). Prior to a data search of the information retrieval system a user's access rights is authenticated or determined using user credentials (such as a password or keycard), an authorization database (storing access rights for users), or any other means suitable to authenticate a user. A user's access rights may vary among different columns, rows, fields, or databases searched.

Tokenization Overview

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., data type-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column.

In some embodiments, to increase the security of tokenization, sensitive data can be tokenized two or more times using the same or additional token tables. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token table entry is generated each time sensitive data is tokenized. A seed value can be used to generate each DLT. In some embodiments, the sensitive data or portions of the sensitive data can be used as a seed value to generate a DLT. DLTs can in some configurations provide a higher level of security compared to SLT but require the storage and/or transmission of a large amount of data associated with each of the generated token tables. While DLT tokenization can be used to tokenize data according to the principles described herein, the remainder of the description will be limited to instances of SLT tokenization for the purposes of simplicity.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be accessed from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

Information Retrieval System

FIG. 1 is a system environment diagram for an information retrieval system, according to one embodiment. The environment of FIG. 1 includes an information retrieval system 100, one or more users (or clients) 110, and a privacy server 115, communicatively coupled through a connecting network 105. A user or other entity can use a client 110 to access the information retrieval system 100 via the network 105. Other embodiments of the system environment can contain different and/or additional components than those shown by FIG. 1.

A client 110 is a computing device capable of processing data as well as transmitting data to and receiving data from the other modules of FIG. 1 via the network 105. For example, the client 110 can be a desktop computer, laptop computer, smart phone, tablet computing device, server, payment terminal, or any other device having computing and data communication capabilities. Each client 110 includes one or more processors, memory, storage, and networking components. Each client 110 is coupled to the network 105 and can interact with other modules coupled to the network 105 using software such as a web browser or other application with communication functionality. Such software can include an interface for communicating with the other modules via the network 105. In some embodiments of the environment of FIG. 1, there can be any number of the clients 110, privacy servers 115, and information retrieval systems 100 connected to the network 105 and communicating with one or more other modules.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network 105 can also be a combination of multiple different networks.

The client 110 is configured to access data from the information retrieval system 100, for instance as part of a search request or query of data records contained within the information retrieval system 100, and is configured to provide the search query to the information retrieval system 100. The information retrieval system 100 is configured to receive the search query, to search the data contained within the system 100, and to provide results of the search back to the client 110 that requested the search, or to another client 110 or entity (such as a bank server, a merchant, and the like). The information retrieval system 100 includes an interface module 120, a search module 130, an indexing engine 140, an encryption module 150, and an indexed database 160 of indexes and data.

The interface module 120 provides an interface that allows an operator of the information retrieval system to interact with the modules of the information retrieval system 100, and is one means for performing this function. To provide an interface to the modules of the information retrieval system 100, the interface module 120 is communicatively coupled to the search module 130, the indexing engine 140, the encryption module 150, and the indexed database 160 of indexes and data.

An operator can, for example, specify various parameters that determine the way the search query received by the information retrieval system 100 is mapped to a search key and hashed. For example, the operator can select via a graphic user interface provided by the interface module 120 an index table and/or hash table from the indexed database 160. The selected index table and/or hash table can be used by the indexing engine 140 to convert a search query into a hashed search key based on the granularity of the search. Similarly, an operator can select via the interface module 120 one or more granularity rules specifying the levels of access rights and corresponding indexes or index tables representing the specified granularity, a search input format, or a search output format. In one embodiment, the encryption module 150 may require an encryption key for use in decrypting encrypted data contained in the database 160, or to encrypt parts of the outputted search results. An operator can provide such an encryption key via the interface module 120.

The search module 130 is configured to receive search query and output the search results, and is one means for performing this function. When the information retrieval system 100 receives a search request from the client 110, it provides the search query to the search module 130, which generates a search key based on the search query. In some embodiments, generating a search key includes converting search query text into a format used to index data in the indexed database 160, hashing or encrypting search query text prior to searching the indexed database 160, and the like.

Upon mapping the search query to the search key, the search module 130 identifies and accesses an index for use in searching the indexed database 160, and is one means for performing this function. The search module 130 is configured to look up a level of access rights associated with the user requesting the search from a authentication module (not shown) that sets the level of access rights for a given user, for instance based on user authentication information (such as a password and/or user credentials). The search module 130 identifies an index based on the determined level of access rights, and accesses the queries the identified index using the search key. In embodiments, in which the indexes used to index the data in the indexed database 160 are hashed, the search module 130 is configured to hash the search key prior to querying the identified index.

The indexing engine 140 generates a plurality of indexes for data stored in the indexed database 160, and is one means for performing this function. Each index is associated with a level of access rights. The indexing engine 140 can also access one or more hash tables, and can hash the indexes used to index the data in the indexed database 160. In some embodiments, the indexing engine 140 can receive indexes and/or hash tables from the privacy server 115 via the network 105 for use in generating the indexes. The indexing engine 140 can periodically re-generate the indexes, and/or can periodically re-hash the indexes, for instance ever 6 hours or once a day. The indexed database 160 stores the indexes associated with the levels of access rights, and the indexed data.

The encryption module 150 encrypts data, indexes, hashes and other information stored in the indexed database 160, and is one means for performing this function. In some embodiments, the encryption preserves the data type of the original unencrypted data by using only a certain character set and maintaining the length of the encrypted data, though in practice any type or format of encryption can be used. In embodiments where the indexed data is encrypted, the encryption module 150 can decrypt the data prior to returning search results, or can return encrypted search results. In embodiments with encrypted indexes, the encryption module 150 can decrypt the indexes prior to querying the indexes, or can encrypt the search key prior to querying the indexes. The encryption module 150 may encrypt the search key using an encryption key provided by a querying user in a search request. In such embodiments, queries made with a search key encrypted with an incorrect encryption key may return incorrect results or no results, while queries made with a search key encrypted with the correct encryption key will return correct results. Such embodiments provide an additional layer of security by guaranteeing correct results only to queries that include the same encryption key used to encrypt an index.

The information retrieval system 100 may be implemented using a single computer, or a network of computers, including cloud-based computer implementations. The operations of the information retrieval system 100 as described herein can be controlled through either hardware or through computer programs installed in computer storage and executed by the processors of such servers to perform the functions described herein. The information retrieval system 100 includes other hardware elements necessary for the operations described here, including network interfaces and protocols, input devices for data entry, and output devices for display, printing, or other presentations of data. The functions and operations of the information retrieval system 100 are sufficiently complex as to require implementation on a computer system, and cannot be performed in the human mind simply by mental steps.

Protection of Private Data Using Multiple
Granularity Database Indices

FIG. 2 illustrates non-hashed and hashed examples of an indexed database, 160*a* and 160*b*, respectively, within the information retrieval system of FIG. 1, according to one embodiment. Each example database 160*a* and 160*b* includes a name column 210*a* and 210*b* within tables 220*a* and 220*b*. The name column 210*a* holds clear text data, whereas the name column 210*b* contains encrypted data. As illustrated, the name column 210*a* in the database includes the clear text surnames "Johnson", "Johnson", "Janson", and "Anderson". The encryption module 150 encrypts the clear text names of column 210*a* and stores them in column 210*b* as the encrypted values "LXwv+NiGiaQ=", "LXwv+NiGiaQ=", "02enc1MV1/o=", and "3Rbi5hSHFjU=".

Name column 210a is indexed using three different non-hashed indexes: index1(a), index2(a) and index3(a), whereas name column 210b uses three respective hashed indexes: index1(b), index2(b) and index3(b). The index1(a) is based on the clear text value of the first character of the name column entries from the name column 210a, the index2(a) is based on the clear text value of the first two characters of the name column entries from the name column 210a, and the index3(a) is based on the clear text value of the first three characters of the name column entries from the name column 210a. Of the three indexes, the index3(a) has the highest level of granularity, and the index1(a) has the lowest level of granularity.

The indexed values in index1(a), index2(a) and index3(a) are hashed by the indexing engine 140, resulting in these indexes being mapped to hashed index1(b), hashed index2(b), and hashed index3(b), respectively. In one embodiment, a first hash table or hash function is used by the indexing engine 140 to map the index1(a) to the hashed index1(b). A second hash table or hash function is used by the indexing engine 140 to map the index2(a) to the hashed index2(b), and a third hash table or hash function is used by the indexing engine 140 to map the index3(a) to the hashed index3(b). The search module 130 can perform a search of the databases 160a or 160b using the non-hashed or hashed indexes, respectively, as will be discussed next with regards to FIG. 3.

A hash function typically uses a fixed-length data value that is a shortened substitute reference to the original non-hashed data value. For example, the trivial hash function maps the original non-hashed data value on itself as the hashed value when the range of data value is small enough and can be represented by computer architecture's internal data type, e.g. a 32-bit integer. Such a trivial hash function is computationally inexpensive and perfect, meaning the mapping is injective. Or integer values i can be mapped to hashed integers of fixed length n using by a hash function of i mod n. A cryptographic hash function randomly maps data values to a fixed-length bit string such that even slight changes of the data values lead to very different hashed bit string values.

The index used by the search module 130 in performing a user requested search depends on the user's access rights level. For a user with a high level of access rights, the search module 130 will use a high granularity index (such as index3(a) or index3(b)); for a user with a medium level of access rights, the search module 130 will search the data using a medium granularity index (such as index2(a) or index2(b)); and for a user with a low level of access rights, the search module 130 will search the data with a low granularity index (such as index1(a) or index1(b)).

As indicated in FIG. 2, the first three entries (rows) of the index1(a) are identical, having the value "J", because the first three names in name column 210a in table 220a start with "J". Accordingly, when the name column 210a is searched by the search module 130 using the index1(a), a search key beginning with the letter "J" will result in the first three entries (values) of the name column 210a being returned, namely "Johnson", "Johnson", and "Janson". The index2(a) indexes the name column by the first two characters of data within the name column 210a. Thus, when the name column 210a is searched using the index2(a), a search key beginning with "Jo" will result in the first two entries of the name column being returned, namely "Johnson" and "Johnson". Thus, based on a higher level of access rights searching the index2(a) returns fewer results that closer represent the search key than searching index1(a), which is the index accessed by a user with lower access rights.

The embodiment of FIG. 3 illustrates data search and retrieval within the information retrieval system of FIG. 1 by users having different levels of access rights, according to one embodiment. The indexed database includes index1(c), index2(c) and index3(c), corresponding to hashed index1(b), index2(b) and index3(b) of FIG. 2, respectively. The hashed index values of these three indexes have been truncated in index1(c), index2(c) and index3(c) to include only the first character of the hashed index values. Truncating index values can result in additional results being returned in response to searches performed using the index, resulting in greater data protection and privacy. Index1(c) has the lowest granularity of the three indexes, and index3(c) has the highest granularity of the three indexes.

Users 1, 2, and 3 are associated with different levels of access rights to the indexed database 160c. Particularly, User 1 has a low level of access rights, User 2 has a medium level of access rights, and User 3 has a high level of access rights. In response to a search of the data by Users 1, 2, and 3, the search module 130 searches the data using index1(c) for User 1, index2(c) for User 2, and index3(c) for User 3, responsive to the respective level of access rights of Users 1, 2, and 3. Although not shown in FIG. 3, Users 1, 2, and 3 have authenticated themselves to the indexed database 160b prior to having access rights granted.

FIG. 3 illustrates search results for Users 1, 2, and 3 in response to a search query for "Johnson" of the indexed database 160c. Prior to searching the database for the term "Johnson", the search system 260 hashes the term "Johnson" for each of the indexes into a search key. For User 1, the search module 130 hashes the term "Johnson" using a first hash function described above to produce the hashed search key "Aa", which is then truncated to "A". Searching index1 300 using the truncated and hashed search key "A" yields four encrypted results 330a for the name column that are returned to User 1. For User 2, the search module 130 hashes the term "Johnson" using the second hash function described above to produce the hashed search key "Cd", which is then truncated to "C". Searching index2(c) using the truncated and hashed search key "C" yields three encrypted results 330b for the name column that are returned to User 2. For User 3, the search module 130 hashes the term "Johnson" using the third hash function to produce the hashed search key "Ge", which is then truncated to "G". Searching index3(c) using the truncated and hashed search key "G" yields two encrypted results 330c for the name column that are returned to User 3.

As seen in FIG. 3, the granularity of the index used to search the data can affect the number of search results returned, and thus the amount of data protection and privacy implemented during searches of the data. As User 1 has the lowest level of access rights, the search module 130 searched the data on behalf of User 1 using the index of the lowest granularity, resulting in the greater number of results. By returning additional search results, the quantity of returned data is increased, increasing the privacy of the data in view of User 1's access of the data. This privacy is increased by providing User 1 only with the encrypted results, thus eliminating the possibility of User 1 identifying the results that directly correspond to the search query.

In comparison, fewer results are returned in response to the search performed on behalf of User 2 using the index of medium granularity, and fewer still are returned in response to the search performed on behalf of User 3. The lower number of results returned for User 2 and 3 is a product of the use of indexes of increasing granularity to search the data, which is a response to the greater access rights of Users 2 and 3. By limiting access to the highest granularity indexes to the most trusted users (users with the greatest access rights), data protection and privacy are maximized.

Figure 4:
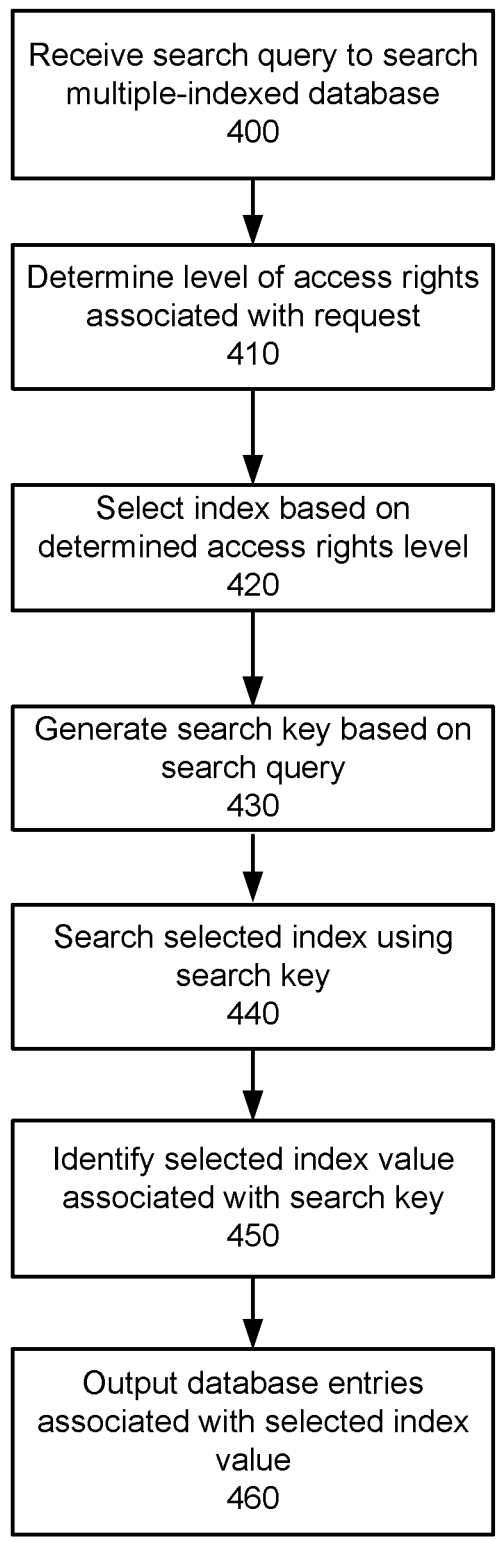
FIG. 4 is a flow chart illustrating the process of searching an indexed database within the information retrieval system of FIG. 1, according to one embodiment.

FIG. 4 is a flow chart illustrating the process of searching an indexed database within the information retrieval system of FIG. 1, according to one embodiment. A search query is received 400 to search a database indexed with multiple indexes. A level of access rights associated with the request is determined 410, and an index is selected 420 based on the determined level of access rights. A search key is generated 430 based on the search query, and the selected index is searched 440 using the search key. A selected index value associated with the search key is identified 450, and data entries associated with the selected index value are outputted 460.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. For instance, data can be indexed to include one or more rules regarding access rights levels such that the search results represents higher dimensional access rights. Similarly, index values can be single hashed or hashed multiple times. These aspects of multi-dimensional indexing and hashing may be performed in concert or independently, and the resulting hashed index can be same or higher dimension than the sum of the dimension of the index and hash function.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may include a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for data protection in a computer system associated with a plurality of levels of access rights, the method comprising:
   receiving, from a requesting entity, a query to search a database indexed with each of a plurality of indexes, each index associated with a different access rights level and including a plurality of values each mapped to a different set of database entries;
   generating, by a hardware processor, a search key based on the received query;
   hashing the generated search key using a hash table;

maintaining a leading portion of the hashed search key and discarding the remainder of the hashed search key to produce a shortened hashed search key;

searching, by the hardware processor, an index corresponding to an access rights level associated with the requesting entity by comparing the shortened hashed search key to a leading portion of hashed index values of the searched index to identify a set of index values; and outputting database entries mapped to the identified set of index values.

2. The method of claim 1, wherein each index of the plurality of indexes is associated with an index granularity defined by an average number of database entries mapped to the same index value.

3. The method of claim 2, wherein a first access rights level associated with a first index of a first granularity is associated with a greater amount of permissible access to the database than a second access rights level associated with a second index of a second granularity lower than the first granularity.

4. The method of claim 3, wherein the number of outputted database entries is on average lower if the requesting entity is associated with the first access rights level than if the requesting entity is associated with the second access rights level.

5. The method of claim 1, wherein the database entries are encrypted, and further comprising:
decrypting the outputted database entries.

6. The method of claim 1, wherein the generated search key is based on text included within the received query.

7. A information retrieval system comprising:
a non-transitory computer-readable storage medium storing executable computer instructions that, when executed, perform steps comprising:
receiving, from a requesting entity, a query to search a database indexed with each of a plurality of indexes, each index associated with a different access rights level and including a plurality of values each mapped to a different set of database entries;
generating a search key based on the received query;
hashing the generated search key using a hash table;
maintaining a leading portion of the hashed search key and discarding the remainder of the hashed search key to produce a shortened hashed search key;
searching an index corresponding to an access rights level associated with the requesting entity by comparing the shortened hashed search key to a leading portion of hashed index values of the searched index to identify a set of index values; and
outputting database entries mapped to the identified set of index values; and
a hardware processor configured to execute the computer instructions.

8. The system of claim 7, wherein each index of the plurality of indexes is associated with an index granularity defined by an average number of database entries mapped to the same index value.

9. The system of claim 8, wherein a first access rights level associated with a first index of a first granularity is associated with a greater amount of permissible access to the database than a second access rights level associated with a second index of a second granularity lower than the first granularity.

10. The system of claim 9, wherein the number of outputted database entries is on average lower if the requesting entity is associated with the first access rights level than if the requesting entity is associated with the second access rights level.

11. The system of claim 7, wherein the database entries are encrypted, and wherein the instructions, when executed, are further configured to perform steps comprising:
decrypting the outputted database entries.

12. The system of claim 7, wherein the generated search key is based on text included within the received query.

13. A non-transitory computer-readable storage medium storing executable computer instructions that, when executed, are configured to perform steps comprising:
receiving, from a requesting entity, a query to search a database indexed with each of a plurality of indexes, each index associated with a different access rights level and including a plurality of values each mapped to a different set of database entries;
generating, by a hardware processor, a search key based on the received query;
hashing the generated search key using a hash table;
maintaining a leading portion of the hashed search key and discarding the remainder of the hashed search key to produce a shortened hashed search key;
searching, by the hardware processor, an index corresponding to an access rights level associated with the requesting entity by comparing the shortened hashed search key to a leading portion of hashed index values of the searched index to identify a set of index values; and
outputting database entries mapped to the identified set of index values.

14. The non-transitory computer-readable storage medium of claim 13, wherein each index of the plurality of indexes is associated with an index granularity defined by an average number of database entries mapped to the same index value.

15. The non-transitory computer-readable storage medium of claim 14, wherein a first access rights level associated with a first index of a first granularity is associated with a greater amount of permissible access to the database than a second access rights level associated with a second index of a second granularity lower than the first granularity.

16. The non-transitory computer-readable storage medium of claim 15, wherein the number of outputted database entries is on average lower if the requesting entity is associated with the first access rights level than if the requesting entity is associated with the second access rights level.

17. The non-transitory computer-readable storage medium of claim 13, wherein the database entries are encrypted, and wherein the instructions, when executed, are further configured to perform steps comprising:
decrypting the outputted database entries.

18. The non-transitory computer-readable storage medium of claim 13, wherein the generated search key is based on text included within the received query.

* * * * *